United States Patent

[19]

Ebert et al.

[11] Patent Number: 6,000,511

[45] Date of Patent: Dec. 14, 1999

[54] ARRANGEMENT OF FOOT OPERATING ELEMENTS FOR A MOTOR VEHICLE

[75] Inventors: Angelika Ebert, Schweinfurt; Thomas Otto, Gochsheim; Jörg Willert, Schweinfurt, all of Germany

[73] Assignee: Mannesmann Sachs AG, Schweinfurt, Germany

[21] Appl. No.: 09/067,056

[22] Filed: Apr. 27, 1998

[30] Foreign Application Priority Data

Apr. 25, 1997 [DE] Germany .......................... 197 17 464

[51] Int. Cl.$^6$ .............................. F16D 67/04; G05G 1/14; B60K 41/24
[52] U.S. Cl. .................. 192/13 R; 192/12 C; 74/478; 74/512
[58] Field of Search ................. 192/13 R, 12 C, 192/85 R, 85 C, 99 S; 74/478, 473.17, 512; 180/315; 60/581, 594; 477/210

[56] References Cited

U.S. PATENT DOCUMENTS

| | | | |
|---|---|---|---|
| 1,851,226 | 3/1932 | White | 192/13 R |
| 2,869,392 | 1/1959 | Müller | 74/512 |
| 3,064,434 | 11/1962 | Parrett | 60/581 |
| 3,208,566 | 9/1965 | Fukuda | 477/210 |
| 3,699,679 | 10/1972 | Bardos et al. | 60/581 |
| 4,884,403 | 12/1989 | Weber | 60/594 X |
| 5,184,468 | 2/1993 | Schonlau et al. | 60/581 |

*Primary Examiner*—Richard M. Lorence
*Attorney, Agent, or Firm*—Cohen, Pontani, Lieberman & Pavane

[57] ABSTRACT

An arrangement of foot operated elements for a motor vehicle includes a first element with a power booster for operating a brake and a second element with a second power booster for operating a clutch of the motor vehicle. The second power booster for actuating the clutch release is arranged adjacent the power booster for actuating the brake device. The power booster for the clutch has a linear guide which guides the second element, which is an actuating push rod by which the second power booster for the clutch can be operated directly. The second power booster for the clutch further has a servo device which further reduces the actuating forces and/or the operating paths for actuating the clutch.

9 Claims, 3 Drawing Sheets

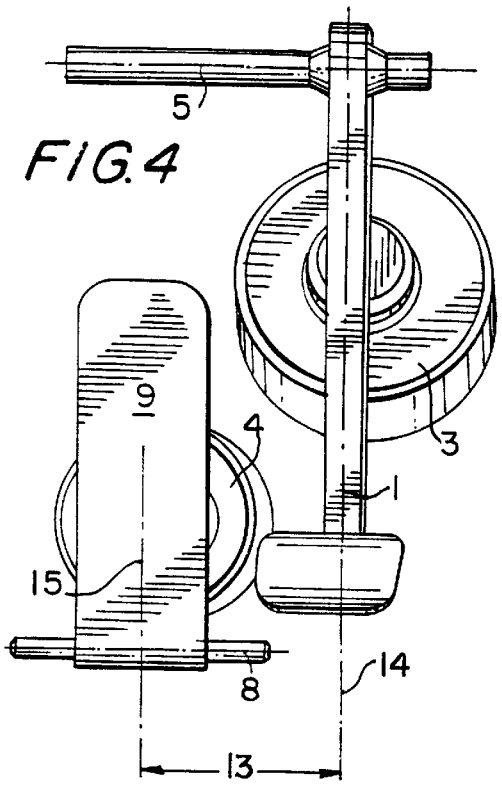
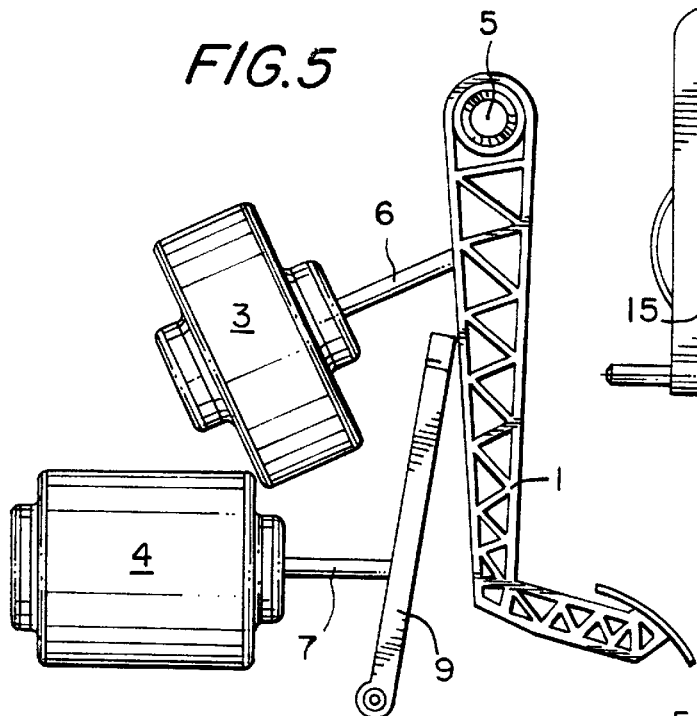
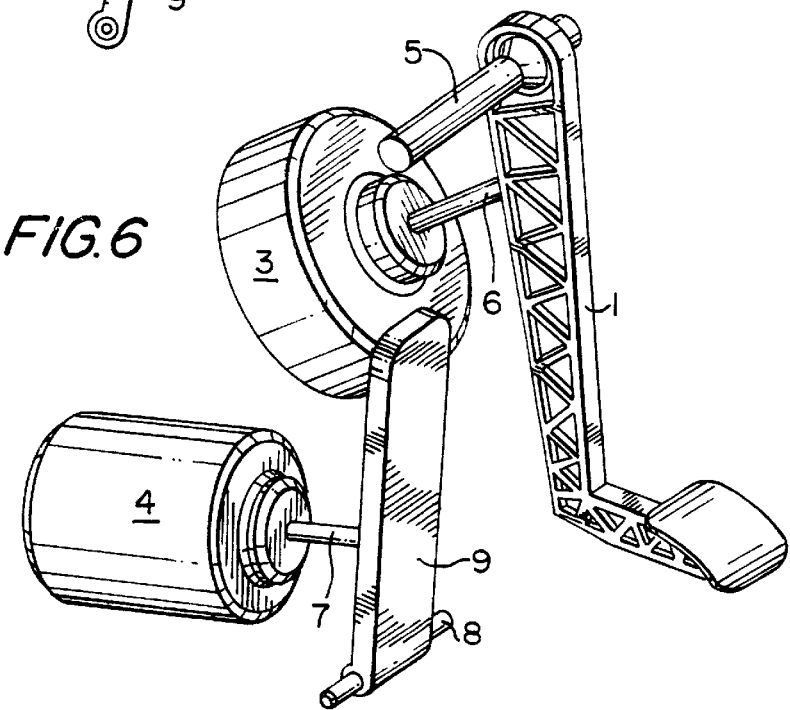

ARRANGEMENT OF FOOT OPERATING ELEMENTS FOR A MOTOR VEHICLE

BACKGROUND OF THE INVENTION

1. Field of the Invention

The invention is related to an arrangement of foot operated pedals for a motor vehicle which are connected with a power assist or mechanically powered device.

2. Description of the Related Art

In motor vehicles which have a clutch pedal and a brake pedal that are each operated by an operating lever, two foot-actuated operating levers are located next to one another, wherein the brake pedal is located on the right-hand side and the clutch pedal is located on the left side. The brake pedal is connected by a tappet or push rod to a first power booster which transmits the actuating forces of the brake pedal to the master cylinder which in turn transmits the actuating forces to a slave cylinder or brake cylinder which is arranged at the individual brake. The power booster usually has a diameter of magnitude such that the arrangement of other power boosters for the actuation of the clutch in the same horizontal plane of the foot space is prohibited. Currently known master cylinders which are connected with the operating lever for the clutch have no power boosting for actuating the release of the clutch. Instead of using a power boosting device at the foot pedal, the release of the clutch in prior art devices is effected by an externally arranged electric, hydraulic, and/or pneumatic source in response to a slave cylinder actuated by the master cylinder. The external source actuating the clutch is adjusted in response to a lever multiplication with respect to the master cylinder actuated by the operating lever such that a sufficient adjusting force is available over the entire path of the operating lever with respect to the above-described release path of the clutch. The lever multiplication is determined by the connection of the master cylinder, via a push rod, to a position on the operating lever which causes a path reduction in relation to the portion of the operating lever that the operator actuates. This enables the construction of relatively compact master cylinders, especially with respect to their cross-sectional dimensions. This, and the partially exposed position of the master cylinder arranged at the operating lever, leads to the current customary construction of master cylinders with small diameters and large lengths.

SUMMARY OF THE INVENTION

It is an object of the invention to arrange a power booster for actuating the brake and a power booster for actuating the clutch substantially adjacent to one another without creating shear forces during operation resulting from an off-center position of the power booster relative to its operating levers to overcome the requirement for external sources and lever multiplication arrangements of the prior art and to economize on installation space in the motor vehicle.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIGS. 4–6 show a pair of operating levers for actuating a brake and a clutch with power boosters arranged substantially adjacent to one another, wherein the first operating lever is swivelable about an upper pivotal axis and the second operating lever is swivelable about a lower pivotal axis.

DETAILED DESCRIPTION OF THE PRESENTLY PREFERRED EMBODIMENTS

Figure 1:
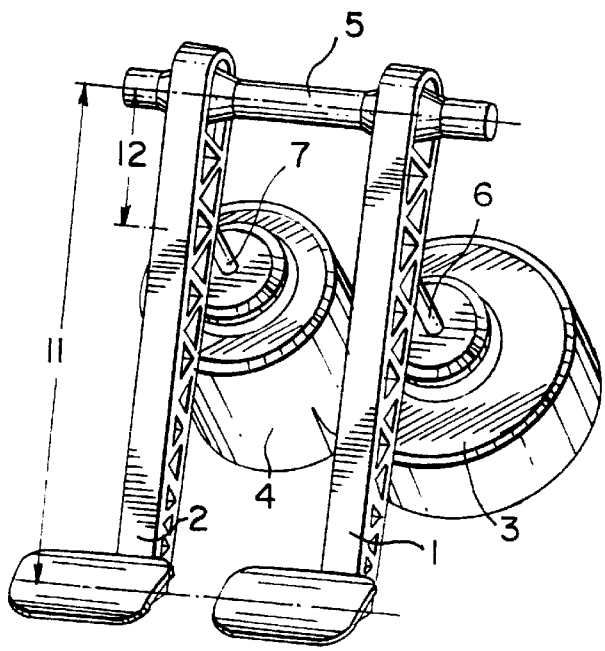
FIGS. 1–3 show a conventional mounting of a first operating lever for a brake and a second operating lever for a clutch and the resulting interference between a first power booster and a second power booster.
Figure 2:
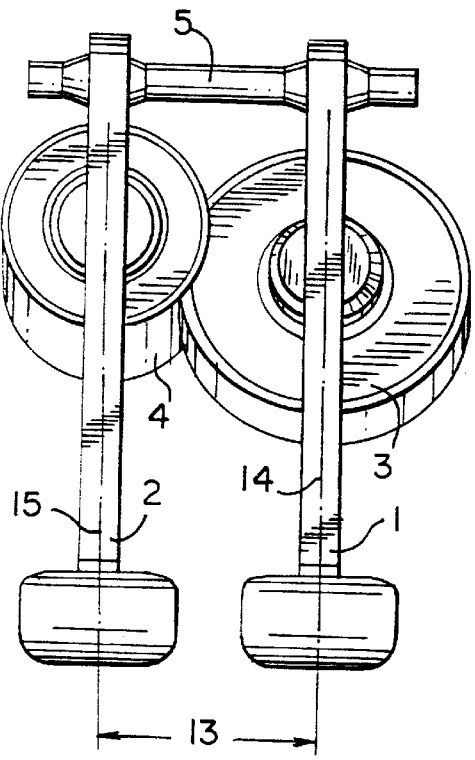
Figure 3:
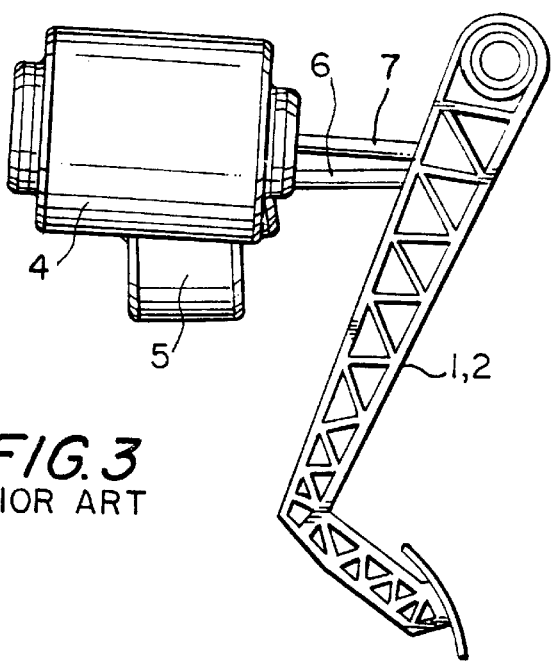

Referring to FIGS. 1–3, a first operating lever 1 for actuating a brake or a clutch in a motor vehicle is suspended from and swivelable about a pivot axle 5. A first push rod 6 connects the first operating lever 1 with the actuatable portion of a first power booster 3. A second operating lever 2 is similarly connected with a second power booster 4 by a second push rod 7. The second operating lever 2 is also suspended so as to be swivelable at the pivot axle 5. The two power boosters 3 and 4 are essentially round displacement units, whose actuatable displacement portions move concentrically via the push rods 6 and 7. The push rods 6 and 7 are connected with the operating levers 1 and 2 such that a lever ratio is effected during operation of the operating levers 1 and 2. The effect of the lever ratio is realized by the arrangement of the push rods 6 and 7 at the operating levers 1 and 2 with an effective lever length 12 proceeding from the center axis of the pivot axle 5. The lever ratio is calculated by the ratio of an overall lever length 11 of the operating levers 1 and 2 to the effective lever length 12. As shown, the center of the first power booster 3 is located essentially below a first center line 14 of the first operating lever 1 and the center of the power booster 4 is arranged below a center line 15 of the second operating lever 2. However, the power boosters 3 and 4 cannot be mounted in the positions shown in FIGS. 1–3 because they interfere with each other.

The operating elements, namely, the first operating lever 1 and the second operating lever 2, are at a defined constant distance 13 from one another which is predetermined by space and ergonomic reasons and therefore is not easily changed without inconvenience to the user. If a power booster with the dimensions of the second power booster 4 is desired, it cannot be arranged adjacently in the same plane and at the same height as the first power booster 3. However, the second power booster 4 may be arranged at a further distance from the axis of pivot axle 5 where there is still sufficient room available as shown in FIG. 4. A power booster 4 positioned in this non-interfering position is not operatable by the suspended operating lever 2 because the required lever ratio of the overall lever length 11 to the effective lever length 12 is not met and because there is no corresponding actuating path. The second power booster 4 may also be arranged in a position offset from the center line 15 of the second operating lever 2. However, this arrangement introduces shear stress to the push rod 7.

To accommodate a second power booster 4 at a distance further from the axis of pivot axle 5 than the first power booster 3, an operating lever 9 shown in FIGS. 4 to 6 is arranged in an upright manner so is to be swivelable about a pivot axle 8 which is positioned below power booster 4 to ensure a proper lever ratio for the power booster 4 given a sufficient pedal path. The arrangement of the operating levers 1 and 9 according to FIG. 4 likewise ensures that the center line 14 of the first operating lever 1 to the second center line 15 of the brake pedal 9 are parallel.

Figure 7:
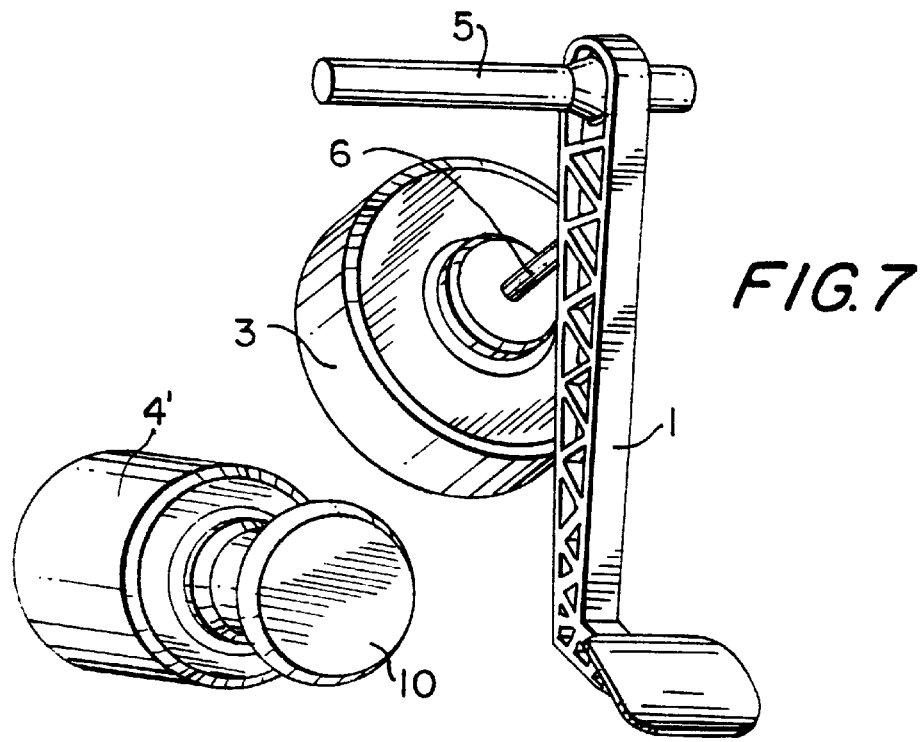
FIGS. 7–8 show an operating lever with the power booster for a brake adjacent a power booster for a clutch that is operated by an actuating push rod.
Figure 8:
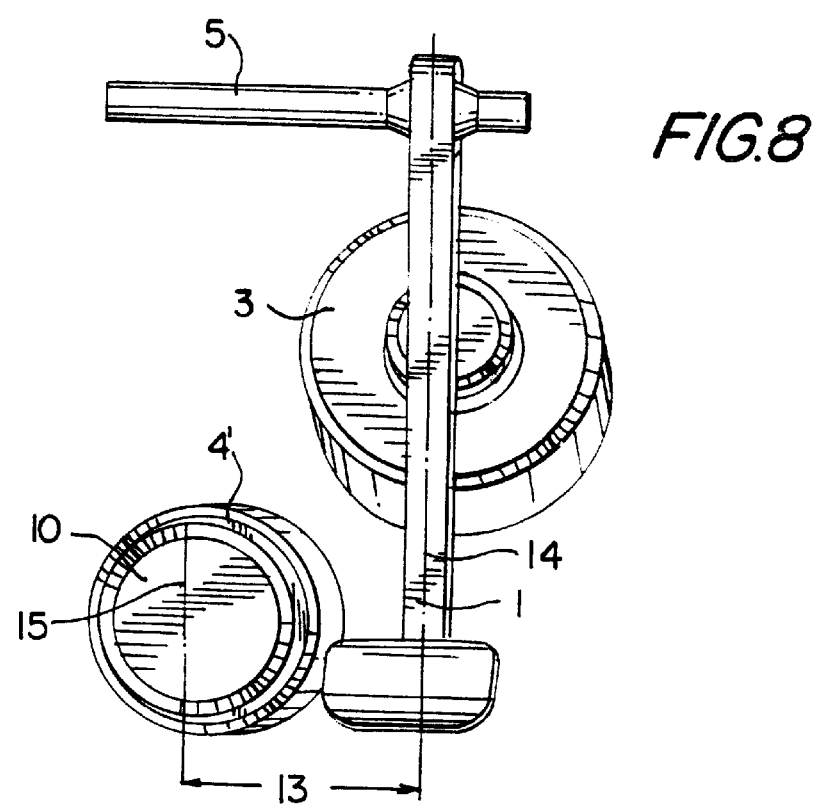

However, the arrangement of an upright operating lever 9 and a suspended operating lever 1 is unusual and requires that the operator become accustomed to it with respect to ergonomics. Therefore, in another embodiment, a power booster 4' according to FIGS. 7 and 8 with a center line 15 at a distance 13 from the center line 14 of the first operating lever 1 includes an actuating push rod 10 instead of an operating lever 2 or 9 which is guided along a linear guide in the power booster 4'. The actuating push rod 10 is activated in turn by the driver of the motor vehicle similar to operating lever 1. Since the power booster 4' is not operated by a lever ratio or lever multiplication, the displacement means of the power booster 4 must be designed such that the actuating forces at the release of the clutch do not change relative to the above-mentioned systems.

Like the first power booster 3 for the brake of the motor vehicle, the second power booster 4' for the release movement of the clutch may be assisted by a pneumatic, hydraulic, or electric auxiliary force or any combination thereof. As the result of this boosting, the actuating forces and the actuating paths required for actuation of the release of the clutch may be sharply reduced.

The invention is not limited by the embodiments described above which are presented as examples only but can be modified in various ways within the scope of protection defined by the appended patent claims.

We claim:

1. An arrangement of foot operated elements for actuating power boosters of operable devices of a motor vehicle, comprising:

a first power booster and a second power booster mountable in a chassis which houses the operable devices;

a first operating element comprising a first lever actuatably connected to the first power booster by a first push rod and swivelably mounted about one of a first pivot axis above the first power booster and a second pivot axis below the first power booster on the chassis; and a second operating element comprising one of a actuator push rod actuatably connected to said second power booster and linearly guidably mounted for moving toward and away from said second power booster and a second lever actuatably connected to the second power booster by a second push rod and swivelably mounted about the other one of the first pivot axis and the second pivot axis;

said first push rod arranged parallel to a first plane of movement of said first lever, said one of said actuator push rod and said second push rod arranged for operation in a second plane of movement parallel to said first plane, and said first and second power boosters are horizontally offset relative to each other.

2. The arrangement of claim 1, wherein said second operating element comprises said actuator push rod and further comprises a linear guide, said actuator push rod being movably mounted so that said actuator push rod moves in and out of said linear guide for directly actuating the second power booster.

3. The arrangement of claim 1, wherein said second power booster comprises a power boost for actuating a clutch of the motor vehicle from one of a hydraulic, an electric, and a pneumatic source.

4. The arrangement of claim 3, wherein said second operating element comprises said actuator push rod and the power boost of the second power booster is adapted for actuation by said second operating element without multiplication of the movement of the actuator push rod.

5. The arrangement of claim 4, wherein the second power booster comprises a linear guide for the second operating element.

6. The arrangement of claim 1, wherein said first operating element comprises said first lever swivelably mounted about said first pivot axis and said second operating element comprises said second lever swivelably mounted about said second pivot axis.

7. The arrangement of claim 1, wherein said first power booster is mounted at a horizontal location that is higher than the second power booster.

8. The arrangement of claim 7, wherein said second operating element comprises said second lever and said second push rod, said second lever comprising an upright pedal for operating said second power booster via said second push rod.

9. The arrangement of claim 7, wherein said second operating element comprises said actuator push rod and said actuator push rod directly operates said second power booster.

* * * * *